United States Patent [19]

Empie, Jr.

[11] Patent Number: 4,526,760

[45] Date of Patent: Jul. 2, 1985

[54] RECOVERY OF HEAT AND CHEMICAL VALUES FROM SPENT PULPING LIQUORS

[75] Inventor: Howard L. Empie, Jr., Goshen, N.Y.

[73] Assignee: International Paper Co., New York, N.Y.

[21] Appl. No.: 580,918

[22] Filed: Feb. 16, 1984

Related U.S. Application Data

[62] Division of Ser. No. 400,492, Jul. 21, 1982, Pat. No. 4,441,959.

[51] Int. Cl.$^3$ .............................................. D21C 11/12
[52] U.S. Cl. .................................... 422/185; 110/210; 162/30.1; 162/30.11
[58] Field of Search ........................... 162/30.1, 30.11; 423/207, DIG. 3; 110/346, 210; 422/185

[56] References Cited

PUBLICATIONS

"Modelling of Fluidized Bed Combustion", Sarofin and Beer, 17th Symp. (Int'l) on Combustion, Combston, Inst. (1979), p. 189.
"Kinetics of Carbon Monoxide Oxidation in Postflame Gases", Howard, Williams, and Fine, 14 Symposium (Int'l) on Combustion at Pittsburg (1973), p. 975.
"A Pilot Plant Study of Fluidised Bed Coal Combustion", Gibbs and Beer, I. Chem. E. Symposium Series No. 43.
"Combustion of Carbon Particles in a Fluidised Bed", Avedesian and Davidson, Trans. Instn. Chem. Engrs. vol. 51, 1973, p. 121.

Primary Examiner—William Smith
Assistant Examiner—K. M. Hastings
Attorney, Agent, or Firm—Royal E. Bright

[57] ABSTRACT

An integrated apparatus and process for recovery of heat and chemical values from spent pulping liquors are disclosed. Novel means for recovering heat values and residual entrained solids from the combustion gases are provided.

2 Claims, 1 Drawing Figure

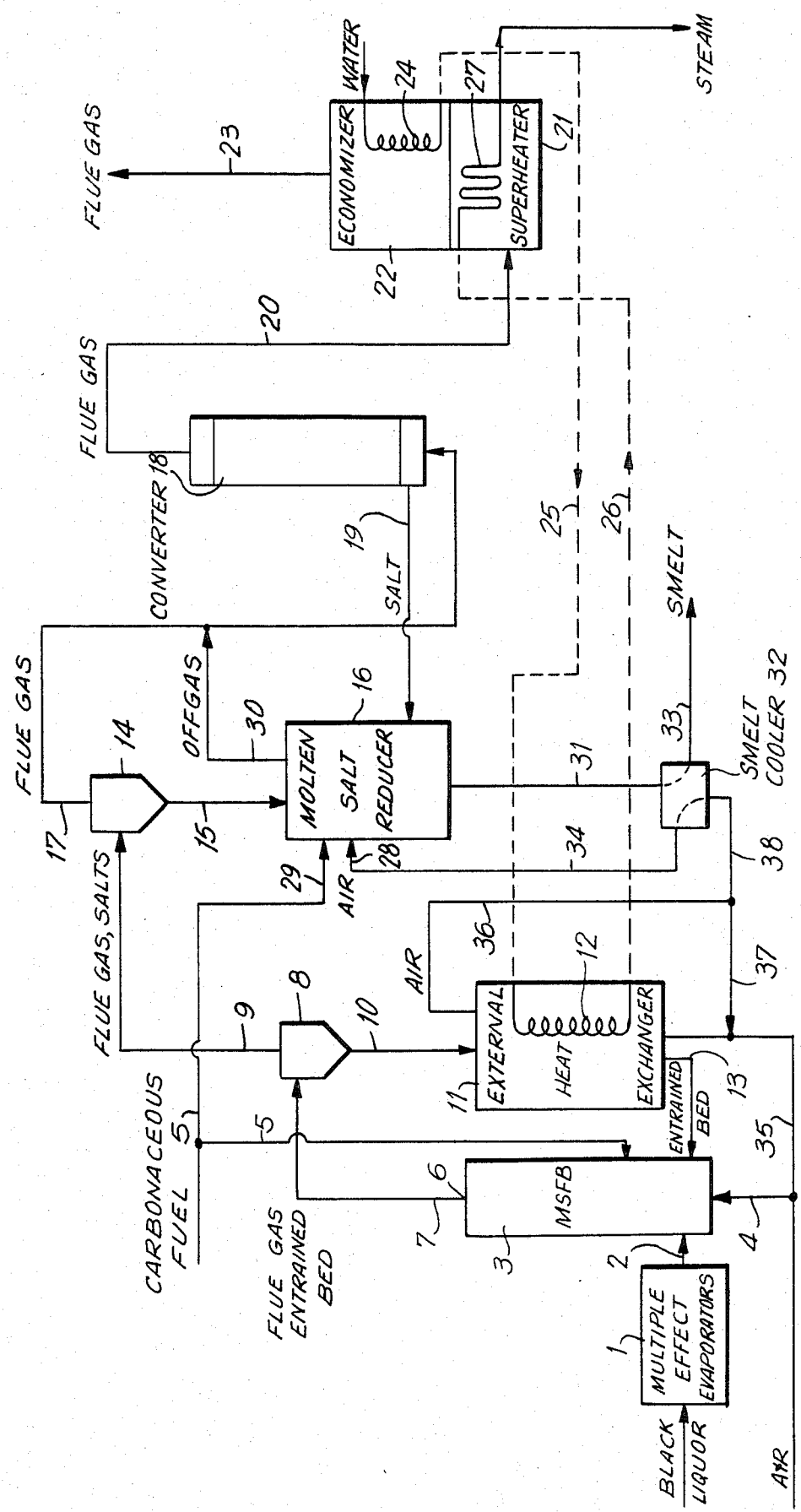

RECOVERY OF HEAT AND CHEMICAL VALUES FROM SPENT PULPING LIQUORS

This is a division of application Ser. No. 400,492, filed 7/21/82 now U.S. Pat. No. 4,441,959.

BACKGROUND OF THE INVENTION

The present invention relates to the art of converting lignocellulosic materials, such as wood, into pulp, more specifically to those processes employing at least some chemicals to convert the lignocellulosic materials into the desired pulp.

The commercially valuable processes for the chemical pulping of lignocellulosic materials, commonly wood chips, are normally referred to as the kraft process, the soda process and the sulfite process. There are also pulping processes which employ a combination of chemical and mechanical pulping steps and these processes are sometimes referred to as semi-chemical or chemi-mechanical pulping processes. These processes use some of the same chemicals as the kraft, soda and sulfite processes.

For a number of reasons, the preferred chemical pulping process is the kraft process which involves cooking or pulping appropriately comminuted pieces of lignocellulosic material, e.g. wood chips, in an aqueous alkaline solution of sodium hydroxide, sodium carbonate, and sodium sulfide. Normally the process is carried out in a pressure vessel called a digester in which the contents are heated to temperatures of about 160° to 180° C., for about one to three hours. Following the cooking or pulping stage the cooking liquor is separated from and to a greater or lesser extent washed out of the pulp and is then subjected to a recovery treatment to recover the chemical and energy values. Because of its dark color the pulping liquor is known as kraft black liquor.

The sulfite process comprises cooking or pulping appropriately comminuted lignocellulosic material in an acidic aqueous solution of sulfur dioxide together with chemicals providing calcium, magnesium, sodium, or ammonium ions. The aqueous solution, thus, contains sulfurous acid, sulfite and bisulfite ions. The cooking period requires from about six to about eight hours during which time the temperature rises to about 140° C. In a variation of this process the cooking liquor may be made neutral or mildly alkaline. Recovery of the spent pulping liquors has been accomplished by a number of techniques. In general, recovery of chemical values from spent liquors of the sulfite process has proven more difficult than recovery of chemical values from the black liquors of the kraft process. This is a significant reason for the predominance of the kraft process over the sulfite process for pulping lignocellulosic material.

The traditional recovery process for kraft black liquor has employed the so-called Tomlinson kraft recovery boiler. In this boiler, concentrated black liquor serves as fuel to provide heat for general process use. The combustion process produces, in addition to the heat generated from the combustion of organic matter present, a smelt or molten body of inorganic chemical which comprises sodium carbonate and sodium sulfide. The furnace process essentially consists of two stages, an initial combustion stage wherein the inorganic salt residue comprises sodium carbonate and sodium sulfate and a second reduction stage wherein sulfate is reduced to sulfide. The molten smelt from the reduction stage is dissolved in water to produce so-called green liquor which is then treated with lime to convert some sodium carbonate to sodium hydroxide thus converting the solution into white liquor after separation of calcium carbonate. The white liquor may then be employed as a kraft cooking or pulping liquor useable in future pulping operations after replenishment of any depleted components.

The Tomlinson recovery furnace is less than an ideal solution to the problem of kraft black liquor energy and chemical recovery for several reasons. These are briefly, an opportunity exists for serious explosions if water inadvertently contacts molten inorganic salts, recovery of energy values is reduced, emission of reduced sulfur compounds to the atmosphere requires extensive odor control and independent control of the physical and chemical actions present in the process is not possible since both oxidation and reduction steps are being carried out in a single vessel within close proximity.

Despite the capital investment in existing recovery systems, it is therefore not surprising that the paper industry has and is investigating alternative recovery possibilities. One such alternative is a multiple solids fluidized bed recovery system described in U.S. Pat. No. 4,303,469 and in U.S. patent application Ser. No. 342,954 filed Jan. 26, 1982. The present invention provides an alternative technique for the operation of the apparatus and of the processes described and claimed therein. In the recovery system of the patent and the application, concentrated spent pulping liquor is combusted in a fluidized bed reactor, employing multiple inert solid components, one of which may be referred to as being of fine particles and the other of coarse particles. The spent liquor is introduced at the bottom of an initial fluidized bed reactor which also contains the plurality of inert solid particle components and is subjected to the introduction of sufficient air to support a substantial combustion of most, but not all, of the organic matter contained in the concentrated spent pulping liquor. Desirably, only about 80 to 90 percent, based on carbon content of the organic material is combusted in the initial fluidized bed. The plurality of inert particulate solid components, more particularly, the finer fraction of said particulate solids, as well as the combustion gases and uncombusted material from the initial fluidized bed reactor, are removed from the top of the fluidized bed reactor and subjected to a separation of most of the inert solids from the mixture of gases and, if necessary, from uncombusted solids from the combusted spent liquor.

When providing for incomplete combustion in the initial fluidized bed reactor, as described above, so as to provide for the formation of uncombusted carbonaceous material, the uncombusted carbonaceous material is intended to provide a reductant for the conversion of sulfate, formed in the initial combustion of the spent liquor, to sulfide.

The separated inert solids are then transmitted to one or more fluidized beds acting as external boilers. This unit or units may preferably contain immersed heat exchange tubes and steam may be generated from the sensible heat released by the solids. The external boiler or boilers remove a significant portion of the residual heat value produced in combustion in the initial fluidized bed reactor and contained in the finer inert solids. These finer inert solids, with much of their heat value recovered, are returned to the bottom of the initial fluidized bed reactor where they are contacted with the air and concentrated spent liquor and refluidized.

The employment of the plural-stage fluidized bed reactors, the initial stage of which employs two sizes of solid particulate components, performs the role of absorbing heat of combustion and as distinguished from conventional fluidized bed reactors some of the solids, as well as the gaseous components are removed at the top of the reactor, instead of the bottom. In this way, combustion is carried out efficiently at high gas velocity without the need of internal heat removal surfaces in the initial fluidized bed reactor. Conventional fluidized bed reactors remove heat via tubes embedded in the reactor which have short useful lives requiring frequent replacement with attendant downtime and these, depending on the operating conditions, may also hinder the fluidization process. The plurality of solid particulate components employed in the initial fluidized bed reactor are inert and perform the roles primarily of recovering heat from the combustion process and providing excellent mixing of air and concentrated spent pulping liquor.

A suitable multiple solid fluidized bed reactor for use in the present invention is disclosed in Nack, et al., U.S. Pat. No. 4,084,545. Suitable multiple inert solid components are disclosed in the aforementioned U.S. Pat. No. 4,303,469 as are typical operating conditions.

The present invention provides an alternative apparatus configuration and process for treating incompletely combusted carbonaceous and sulfurous materials in the flue gases resulting from the processes of the recovery system and for recovery of very fine residual particulate matter entrained in the flue gases.

CITATION OF RELEVANT ART

In addition to the above discussed patents and applications, applicant is aware of the following publications which may be considered relevant to this invention.

U.S. Pat. No. 3,322,492 which discloses a kraft liquor recovery system wherein black liquor is dried and oxidized in an initial fluidized bed with the aid of auxiliary fuel, the solid liquor residue is passed to a second fluidized bed reductor from which solid $Na_2S$ and $Na_aCO_3$ are passed through an optional heat exchanger and thence to a conventional dissolving tank and green liquor treatment system.

U.S. Pat. No. 3,408,167 which discloses an after burner to insure complete combustion of flue gases from a waste combustor such as an incinerator.

U.S. Pat. No. 3,,711,593 which discloses a chemical recovery system for sulfite liquors which includes a step of burning sulfide containing gases, separated from sodium carbonate, in a boiler to recover heat values and generate sulfite for recombination with the sodium carbonate to form sodium sulfite.

U.S. Pat. No. 3,718,446 which discloses the use of off gases from kraft mill processes as a source of make-up air in a particular pyrolysis combustion process for recovery of kraft black liquor chemical and heat values.

U.S. Pat. No. 4,244,779 which discloses an alternative proposed fluidized bed combustion process useful inter alia for kraft recovery.

Sarofim and Beer, Modelling of Fluidized Bed Combustion, 17th Symp (Int'l) on Combustion, Combustion Inst. (1979), p. 189; Howard, Williams and Fine, Kinetics of Carbon Monoxide Oxidation in Postflame Gases, 14th Symposium (Int'l) on Combustion (1973), p. 975; Gibbs and Beer, A Pilot Plant Study of Fluidized Bed Coal Combustion, I. Chem. E. Symposium Series No. 43; and Avedesian and Davidson, Combustion of Carbon Particles in a Fluidized Bed, Trans. Instn. Chem. Engrs., Vol. 51, 1973, p. 121 all of which are concerned with combustion kinetics of carbonaceous materials (coal) in fluidized bed combustors.

The present invention differs substantially from the teachings of all the cited references either singly or when taken together.

SUMMARY OF THE INVENTION

The invention provides an integrated process for the recovery of energy and chemical values from spent pulping liquors comprising an initial stage of subjecting concentrated spent pulping liquor to combustion with air in a fluidized bed reaction chamber provided with a plurality of inert solid particulate materials, at least one of which is of a finer particle size than another, followed by at least one further step of treating the finer particulate size inert particulate material in an external fluidized bed unit to recover heat values, wherein at least a portion of said inert finer particle size solid particulate material is separated from the gaseous and solid combustion products produced by said combustion with air; at least a second further step wherein said solid combustion products and said gaseous combustion products are separated leaving a minor portion of said solid combustion products entrained in said gaseous combustion products and at least a third further step wherein said gaseous combustion products containing said entrained solid combustion products are further oxidized at a temperature greater than the melting point of said solid combustion products.

This process aspect of the invention possesses the inherent applied use characteristics of providing a process for the economic recovery of heat and chemical values from pulping process spent liquors while permitting efficient process control, permitting substantial reduction in and control of emission of noxious and potentially toxic gases, elimination of or reduction of the necessity for precipitators or other particulate recovery equipment for cleansing of exhaust gases passing to the environment, more complete recovery of the heat values in the black liquor.

Special mention is made of particular embodiments of the invention wherein the spent pulping liquor is kraft or sulfate process waste or black liquor, wherein initial combustion with air is conducted in an incomplete fashion particularly where such incomplete combustion is conducted in the presence of an additional carbonaceous fuel, those wherein the solid combustion products comprise the finer particle size solid particulate material and those wherein a supplemental reductant is added directly to a reduction step for the solid combustion products.

The invention also provides an integrated apparatus for performing the process aspect of the invention.

BRIEF DESCRIPTION OF THE DRAWING

The FIGURE is a schematic representation of an apparatus and process for the recovery of the heat and chemical values of kraft black liquor.

DESCRIPTION OF THE PREFERRED EMBODIMENT

The manner of practicing the process of the invention employing the apparatus of the invention will now be illustrated with reference to the drawing and to a specific embodiment namely the recovery of kraft black liquor.

Kraft black liquor, as it is removed as an effluent in the pulping of wood in a paper making plant, is normally of relatively low solids concentration, containing usually approximately 14 percent by weight of solids. In the practice of the process of the invention, this liquor is desirably concentrated to a total solids content of at least about 50 percent and desirably between about 50 and 100 percent by weight of solids, preferably about 60 to 85 percent by weight. This may be accomplished by treating the kraft black liquor as it leaves the pulping operation in multiple-effect evaporators (1) to remove a large proportion of the water and increase the total solids content.

In normal operation, the effluent from the multiple effect evaporators (1) has a total solids content of about 65 percent by weight and has had its temperature increased to about 150° to 200° F., desirably about 180° F., where it is passed through conduit (2) into initial fluidized bed reactor (3), near the lower end of the reactor. In accordance with one embodiment of the invention, the fluidized bed reactor is a multiple solids fluidized bed reactor of the type disclosed in Nack, et al., U.S. Pat. No. 4,084,545, granted Apr. 18, 1978. See FIG. 2 of the drawings of that patent and the relevant specification.

The multiple solids fluidized bed reactor (3) is operated with a plurality of solids present. The finer and entrainable solid may be Speculite, sand or some other inert material of particles of −16+140 mesh U.S. sizes; that is, the particles will pass through a 16 mesh screen but not through a 140 mesh screen, and the coarse, non-entrainable particles may be an equal amount by weight of Speculite or other dense inert material of about −12+16 U.S. mesh size.

Into the fluidized bed reactor (3) there is also introduced air at ambient or elevated temperature through the bottom of the reactor as shown at (4) along with optional carbonaceous fuel, for example, at or near the bottom of the reactor as shown at (5), together with the concentrated black liquor which also enters the reactor near the bottom as shown at (2). The amounts of air, concentrated black liquor and any carbonaceous fuel may be adjusted to provide combustion of about 80 to 90 percent based on carbon content of the black liquor and any carbonaceous fuel, while yet suspending all solids present. The gaseous products of the combustion process comprise primarily carbon dioxide, nitrogen, and water vapor, but also comprise small amounts of carbon monoxide, hydrogen and methane. The inorganic or mineral content of the black liquor is converted to sulfate and carbonate salts, normally sodium sulfate and sodium carbonate. Because the combustion of organic material in the combination of black liquor and any optional carbonaceous fuel present is intended to be incomplete, carbonaceous materials, including carbon, are produced. Desirably, sufficient combustion takes place to generate a temperature within the fluidized bed reactor (3) of between about 1100° and 1300° F., preferably below about 1225° F. At this temperature range the non-gaseous combustion products are solids.

The superficial velocity of the air introduced is adjusted to about 15 to about 30 feet per second so as to permit entrainment of most of the solids produced by combustion in the reactor (3) along with much of the entrained fine particle solid. These solids escape out the top (6) of the fluidized bed reactor (3). The combined entrained solids are transferred through conduit (7) into gas-solids separator (8) which separates most of the inert solid content from the mixture of combustion residue solids and gases. The gaseous materials, comprising primarily carbon dioxide, nitrogen and water vapor, are removed from the top of the gas-solids separator (8) through conduit (9) along with a major portion of the combustion product inorganic solids, comprising sulfate and carbonate, and uncombusted carbonaceous materials. The major portion of the inert solids, consisting of the fine particle size inert solid and unseparated inorganic sulfate, carbonate and uncombusted carbonaceous material is removed from gas-solids separator (8) through conduit (10). The solids transferred from the gas-solids separator (8) through conduit (10) are desirably at a temperature of between about 1100° and 1300° F., preferably below about 1225° F.

The inert solid component is passed from separator (8) through line (10) into heat exchanger (11) whereby a portion of the heat of the remaining solids is exchanged into a tube (12) containing water, producing steam. The heat exchanger (11) is a conventional unit employed in combination with a conventional fluidized bed whereby the tube (12) provides the role of a heat removal component. The solids, having surrendered a good portion of their heat are removed from the heat exchanger (11) through conduit (13) and returned into the bottom of multiple solids fluidized bed reactor (3) to be recycled therethrough.

The gaseous component removed from the gas-solids separator (8) through conduit (9) containing the combustion gases from reactor (3), sulfate and carbonate solids and uncombusted carbonaceous material are passed through a second gas-solids separator (14) where additional separation is made of retained solids, namely, the uncombusted organics and inorganic salts of sulfate and carbonate ions, such as sodium and potassium sulfate and carbonate, which are removed from the bottom of gas-solids separator (14) through conduit (15) into reducer (16). In the normal operation of the process, the gaseous effluent from gas-solids separator (14), passing out of the top thereof and through conduit (17), contains almost no reducing gases, particularly those containing sulfur in oxidation states below the +4 formal valence state, and is composed mostly of carbon dioxide, nitrogen, moisture, traces of sulfur dioxide, carbon monoxide, hydrogen, and methane. These gates having been almost completely separated from but having some entrained solids and passed through conduit (17) are transmitted into converter (18) which is a converter of conventional design in which the gaseous effluent from gas-solids separator (14) is oxidized adiabatically at about 1450° F. (790° C.) or at even higher temperatures. In the vicinity of this temperature, substantially complete oxidation of the carbon monoxide, hydrogen and methane by excess oxygen present in the gas is very rapid and the minor fraction of entrained combustion salts becomes molten. The molten salts are drawn off through line (19) and conveyed to molten salt reducer (16).

The oxidized gases which now contain substantially no further oxidizable material are exhausted from converter (18) and passed through duct (20) to superheater (21) and economizer (22) before being passed through duct (23) to any necessary sulfur dioxide recovery and subsequently to the environment. Economizer (22) and superheater (21) may be employed to recover heat values by initially heating water in tube (24) in economizer (22) passing this heated water through pipeline (25) to tube (12) in external heat exchanger (11) where the temperature of the water may be further increased to generate steam. The steam may then be passed through pipeline (26) to tube (27) in superheater (21) wherein the steam may be converted to superheated steam. One skilled in the art will, of course, recognize that hot water from tube (24) and steam from tube (12) will be themselves useful for various industrial operations in a paper mill and portions of these may be recovered and used directly without passing into the next heat recovery stage. Both economizer (22) and superheater (21) are well known conventional process equipment. It is preferred that they be designed and operated so that flue gases which leave the converter (19) at about 1450° F. or higher leave the economizer at about 400° F.

The solids introduced into reducer (16) through conduit (15) are mingled with air introduced through inlet (28) and the molten residual salts from converter (18) introduced through duct (19).

The reducer (16) is a standard furnace or reactor. The purpose of the introduction of air into the reducer (16) is to oxidize sufficient amounts of uncombusted carbonaceous material, and additional reductant optionally provided through inlet (29) to provide the heat required for reduction of sulfate to sulfide, an endothermic reaction. The remaining uncombusted carbonaceous material and additional reductant are employed in the reduction. Complete reaction of all such components is not a realistic expectation and some obnoxious gases especially hydrogen sulfide and other volatile compounds containing sulfur in a negative or reduced formal valence state, may remain. To avoid the necessity for provision of other means of removal of the obnoxious gases, conduit (30) may introduce these gases to the flue gas stream in conduit (17) prior to introduction into converter (18). The reducer is desirably operated at a temperature of about 1650° F. The reducer contains a molten mixture of about one to three parts by weight of sodium carbonate and about one part by weight of sodium sulfate and sodium sulfide combined in which a substantial amount of the chemical reduction takes place, and which is provided with a means of agitation.

The purpose of reducer (16) is to reduce much of the inorganic sulfate solids to sulfides, which are necessary components of the kraft pulping solutions.

The uncombusted carbonaceous material performs a dual role in the reducer. It acts as a potent chemical reducing agent to reduce sulfate and any thiosulfate which may be present to sulfide salts and to supply heat of combustion due to the oxidation of the carbonaceous material with the aid of the air introduced in inlet (28). The reduction of sulfate to sulfide is an endothermic reaction and heat to support this reaction is conveniently supplied by oxidation of part of the carbonaceous material or other reducing agents optionally provided.

The molten solids are removed from reducer (16) through conduit (31) in which stage the molten solids are in the form of inorganic sulfides, carbonates, and some unreduced sulfates. Conventionally these will be as sodium salts. These molten salts are passed through conduit (31) into smelt cooler (32) wherein some of their heat content is removed to reduce their temperature to the point, about 1400° F., where they can be passed out of the smelt cooler and on through conduit (33) to a conventional smelt dissolving tank for further processing back into kraft white pulping liquor in conventional fashion. Heat recovered in the smelt cooler (32) may be employed to warm air passing through duct (34) to about 1300° F. prior to introduction through inlet (28) into reducer (16).

To provide oxygen for the various combustion steps in the process and fluidizing gas for multiple solids fluidized bed (3) and external heat exchanger (11) it is convenient to provide a supply of air to the system. Conveniently air may be provided through duct (35), a required portion thereof diverted through duct (4) to provide fluidizing gas for fluidizing the bed in multiple solids fluidized bed reactor (3) and oxygen for the combustion taking place therein. Sufficient air continues through duct (35) to fluidize the solids bed in heat exchanger (11). Air exits heat exchanger (11) through duct (36) having a substantial heat content. Therefore, a portion of the air in duct (36) is recycled to duct (35) through duct (37) to be recycled as fluidizing gas through heat exchanger (11). The remaining portion of air in duct (36) may be passed through duct (38) into smelt cooler (32) where it is further warmed and passed through duct (34) to inlet (28) where it is introduced into reducer (16) to provide oxygen for the combustion reaction therein.

Thus, by operation of the process, black liquor has had a substantial portion of its organic matter combusted in fluidized bed reactor (3) optionally while coal or another carbonaceous fuel, such as petroleum, or petroleum coke has been added to provide additional heat value and a supplemental source of uncombusted carbonaceous material for use in the reduction processes of reducer (16). After the combustion process, in a sequence of steps, the heat values are recaptured in the form of hot water and steam which in turn are employed directly in various plant processes or indirectly to generate energy in other forms for use in the plant. The mineral components are recovered to form a conventional green liquor, processable by known conventional techniques for reuse in the pulping operation, and toxic and obnoxious gases are retained within the system until they are converted to compounds acceptable for release or handling by more economical pollution control techniques than would be required for control of the toxic and obnoxious gases in their original form. This is facilitated, of course, in the process mode wherein effluent gases from the reducer are recycled through conduit (30) back to conduit (17) for combination with flue gas passing through conduit (17) to converter (18) for treatment therein.

As stated above, the addition of coal, petroleum, or other carbonaceous fuels in addition to providing additional fuel value during the combustion process in initial fluidized bed reactor (3) permits combustion to be carried out under a wide range of conditions while insuring that ample unburned carbonaceous material will be provided as a reduction source in the reduction reaction of reducer (16).

One of skill in the art will recognize that it may be necessary to provide an additional reductant for proper operation of reducer (16) under certain operating conditions of the entire system. Preferred supplemental reductants will be carbon sources such as coke, petroleum coke, natural gas, producer gas, and the like. Use of such carbon sources as coal directly in reducer (16) will not be preferred because moisture and volatiles present in the coal will interfere with smooth operation of reducer (16).

The process provides an effective means of solid separation and recovery. Exiting at the top of reactor (3) are flue gas, a portion of the inert bed solids, and oxidized salts to be recovered and reused in the pulping operation, along with the uncombusted carbonaceous material to be employed in the reduction process. The inert bed solids which are entrained in reactor (3) are separated in an initial gas-solids separation (8) and subsequently recovered and recycled to the reactor. The flue gas, salts and uncombusted organics are effectively separated by conventional gas-solids separation equipment, with the process solids flowing to reducer (16).

The external heat exchanger or boiler (11) serves the important role of recovering heat of combustion as stored in the sensible heat from the separated bed solids, thus, avoiding the necessity of providing heat exchanger tubes directly in fluidized bed reactor (3). In addition to improved operation of the fluidized bed combustion zone provided by the absence of heat exchanger tubes therein, corrosion of the heat exchanger tubes is also substantially reduced.

An important phase of the chemical reductions and of the process as a whole is the conversion of sodium sulfate to sodium sulfide which is an important ingredient in the kraft pulping process. This reduction takes place in reducer (16), as described. Reduction takes place in the molten salt portion in the lower portion of reducer (16). Air is introduced into the reducer (16) at (28) to oxidize combustible gases such as hydrogen and carbon monoxide before they exit the reducer. The air, of course, also performs the important role of oxidizing uncombusted carbonaceous material to provide heat. These reactions are exothermic and provide the thermal energy necessary for supporting the reduction reactions occurring in the reducer which are endothermic.

The particular grade or type of coal, petroleum or other optional carbonaceous fuel employed in the process is not particularly critical. Any heavy grade fuel oil or even crude oil may be employed. Similarly any available grade anthracite, or bituminous coal, petroleum coke or even lignite in particle sizes compatible with the means employed for introduction into the reactor may be employed.

When bituminous coal is employed as fuel, it may be employed from 1:5 to 1:100 by weight, preferably about 1:20 by weight ratio to black liquor feed solids.

In addition to Speculite, a hematite ore containing about 93% $Fe_2O_3$ supplied under that trademark by C. E. Minerals, Inc., King of Prussia, Pa., other inert materials suitable for use as the inert bed solids are aluminum oxide, nickle, or nickel oxide. Sand is suitable for the smaller size particles. The finer solid bed component may also be limestone or dolomite.

One of skill in the art will recognize that as used herein and in the appended claims the term "inert" means that a material is substantially unaffected chemically in a particular unit operation and may pass into and be recovered from that operation with no substantial chemical change even if in another unit process, it may be a reactant. Thus, the salts produced by the combustion are suitable inert solids in the combustion phase unit process and a portion thereof may be separated from the salts being passed toward the reducer (16) and be recycled as the finer solid bed component.

One of skill in the art will recognize that separation of the two solid particle phases employed in the fluidized bed combustor may occur because of differences in particle size or in density or a combination thereof. The term finer particle size, therefore, comprehends particles of relatively lesser density and the term larger particle size also comprehends relatively denser particles.

The subject matter which applicant regards as his invention is particularly pointed out and distinctly claimed as follows:

1. An integrated apparatus for the recovery of energy and chemical values from spent pulping liquors comprising:
   (a) an initial fluidized bed reaction chamber provided with means for combusting concentrated spent pulping liquor with air and a plurality of solid particulate materials, at least one of which is of finer particle size than another;
   (b) means for separating the finer particle size inert particulate material from the gaseous and solid combustion products communicating with the top portion of said initial fluidized bed reaction chamber;
   (c) a fluidized bed heat exchanger means external to said initial fluidized bed reaction chamber communicating with said means for separating the finer particle size inert particulate material;
   (d) means for returning separated finer particle size inert particulate material to the initial fluidized bed reaction chamber communicating with the fluidized bed heat exchanger means;
   (e) oxidation reactor means for further combusting said gaseous combustion products at a temperature greater than the melting point of the solid combustion products;
   (f) means for carrying gaseous and solid combustion products of the initial combustion step to the oxidation reactor means, said means for carrying gaseous and solid combustion products communicating with the means for separating finer particle size inert particulate material from the gaseous and solid combustion products;
   (g) reducer means for reducing at least a portion of the solid combustion products by action of a reducing agent in a molten inorganic salt mass and recovering a smelt; and
   (h) means for recovering and conveying to the reducer means, molten salts produced in the oxidation reactor means communicating with both the reducer means and the oxidation reactor means.

2. Apparatus as defined in claim 1 wherein means for introducing exhaust gases from the reduction of at least a portion of the solid combustion products into the means carrying gaseous and solid combustion products of the initial combustion step immediately prior to the reactor means for further combustion of said gaseous combustion products are provided.

* * * * *

UNITED STATES PATENT AND TRADEMARK OFFICE
CERTIFICATE OF CORRECTION

PATENT NO. : 4,526,760

DATED : July 2, 1985

INVENTOR(S) : HOWARD L. EMPIE, JR.

It is certified that error appears in the above-identified patent and that said Letters Patent is hereby corrected as shown below:

Column 3, line 44, "$Na_aCO_3$" should read -- $Na_2CO_3$ --.

Column 6, line 48, "gates" should read -- gases --.

Signed and Sealed this

Twelfth Day of November 1985

[SEAL]

Attest:

DONALD J. QUIGG

Attesting Officer

Commissioner of Patents and Trademarks